United States Patent
Hou et al.

(10) Patent No.: US 10,023,463 B2
(45) Date of Patent: Jul. 17, 2018

(54) PHOSPHORUS ABSORPTION BY HYDRATION AND FLUORINE RECOVERY FOR FUME EXITING KILN IN KILN PHOSPHORIC ACID PROCESS

(71) Applicant: SICHUAN KO CHANG TECHNOLOGY CO., LTD, Chengdu (CN)

(72) Inventors: Yonghe Hou, Chengdu (CN); Shifa Wei, Chengdu (CN); Chenjuan Wei, Chengdu (CN)

(73) Assignee: SICHUAN KO CHANG TECHNOLOGY CO., LTD., Chengdu (CN)

( * ) Notice: Subject to any disclaimer, the term of this patent is extended or adjusted under 35 U.S.C. 154(b) by 250 days.

(21) Appl. No.: 14/958,914

(22) Filed: Dec. 3, 2015

(65) Prior Publication Data

US 2016/0152475 A1    Jun. 2, 2016

Related U.S. Application Data

(63) Continuation-in-part of application No. PCT/CN2013/081225, filed on Aug. 9, 2013.

(30) Foreign Application Priority Data

Jun. 4, 2013  (CN) .......................... 2013 1 0218625

(51) Int. Cl.
   - *C01B 25/20* (2006.01)
   - *B01D 53/68* (2006.01)
   - *B01D 1/16* (2006.01)

(52) U.S. Cl.
   CPC ............... *C01B 25/20* (2013.01); *B01D 1/16* (2013.01); *B01D 53/68* (2013.01);
   (Continued)

(58) Field of Classification Search
   None
   See application file for complete search history.

(56) References Cited

U.S. PATENT DOCUMENTS

| | | | |
|---|---|---|---|
| 2,247,373 A | † | 7/1941 | Hartford |
| 3,024,086 A | * | 3/1962 | Cines ..................... B01D 53/68 |
| | | | 210/915 |

(Continued)

FOREIGN PATENT DOCUMENTS

| | | |
|---|---|---|
| CN | 90105433 C | 10/1991 |
| CN | 1071097 A | 4/1993 |

(Continued)

OTHER PUBLICATIONS

International Search Report in international application No. PCT/CN2013/081225, dated Mar. 6, 2014.

(Continued)

*Primary Examiner* — Wayne Langel
(74) *Attorney, Agent, or Firm* — Syncoda LLC; Feng Ma; Junjie Feng

(57) ABSTRACT

Disclosed is a method for phosphorus absorption by hydration and fluorine recovery for a fume exiting a kiln in a kiln process for the production of phosphoric acid, comprising the following steps: a fume containing $P_2O_5$ and fluorine exiting a kiln is introduced into a hydration tower, the fume performs heat and mass transfer with the spraying liquid, with most of the phosphoric acid produced being absorbed into the spraying liquid; the phosphoric acid solution falling from the spraying finally enters the acid solution circulating and spraying system; the fume discharged from a fume outlet then passes through a phosphoric acid mist capturing tower and a mist removing and separating tower successively, such that the phosphoric acid mist entrained in the fume exiting the hydration tower is further captured.

15 Claims, 6 Drawing Sheets

(52) U.S. Cl.
CPC ............... *B01D 2257/2027* (2013.01); *B01D 2257/2066* (2013.01); *B01D 2257/55* (2013.01); *B01D 2258/0283* (2013.01); *Y02P 20/154* (2015.11)

(56) References Cited

U.S. PATENT DOCUMENTS

| | | | |
|---|---|---|---|
| 3,091,513 | A † | 5/1963 | Parish |
| 3,273,713 | A † | 9/1966 | Parish |
| 4,389,384 | A | 6/1983 | Hard |
| 7,910,080 | B2 † | 3/2011 | Megy |

FOREIGN PATENT DOCUMENTS

| | | | |
|---|---|---|---|
| CN | 93111447.0 | C | 12/1994 |
| CN | 1150550 | A | 5/1997 |
| CN | 101049920 | A * | 10/2007 |
| CN | 200710052195.4 | A | 10/2007 |
| CN | 202015577 | U | 10/2011 |
| CN | 102826552 | A | 12/2012 |
| CN | 202715347 | U | 2/2013 |

OTHER PUBLICATIONS

English Translation of the Written Opinion of the International Search Authority in international application No. PCT/CN2013/081225, dated Mar. 6, 2014.

M.M. Striplin, Chemical Engineering Report No. 2, Development of Processes and Equipment for Production of Phosphoric Acid, Wilson Dam, Alabama, pp. 1-16, 30-78 (Tennessee Valley Authority 1948).†

John Munroe Craig, Fluoride Removal From Wet-Process Phosphoric Reactor Gases, pp. 1-201 (University of Florida 1970).†

European Fertilizer Manufacturers' Association, Best Available Techniques for Pollution Prevention and Control in the European Fertilizer Industry Booklet 4 of 8: Production of Phosphoric Acid, pp. 1-44 (2000).†

W. Douglas Belle, Fertilizer Industry: Fertilizer Development & Environmental Protection, FSA Recovery from Phosphoric Acid Evaporators, pp. 1-3, 5, 7, 8 (Arab Fertilizer Association 2008).†

Paul A. Smith, History of Fluorine Recovery Processes, pp. 1-20 (IFA Technical Sub-Committee and Committee Meeting Sep. 15-17, 1999, Novgorod, Russia).†

George C. Pedersen, The State of the Art in Gas Cleaning for the Fertilizer Industry, pp. 1-15 (Presented at Arab Fertilizer Association 2001).†

U.S. Environmental Protection Agency AP42, Fifth Edition, vol. I, Inorganic Chemical Industry, Chapter 8, Jul. 1993 (Reformatted Jan. 1995); Section 8.9 Phosphoric Acid, pp. 8.9-1-8.9-8.†

Hayet Omri and Narjes Harrouch Batis, Various Methods Used for the Treatment of the Wet-Phosphoric Acid, Journal of Environmental Science and Engineering B 2, pp. 482-494 (2013).†

M. Abdalbake and O. Shino, Removing the Cadmium, Arsenic and Sulfate Ions From Wet Process Phosphoric Acid, Periodica Polytechnica Ser. Chem. Eng. vol. 48, No. 1, pp. 63-71 (2004).†

John R. Van Wazer, Phosphorus and Its Compounds, in Two Volumes vol. II: Technology, Biological Functions, and Applications, pp. 1212 (Interscience Publishers, Inc., New York 1961).†

H.Y. Allgood et al., Design of Equipment to Produce Phosphoric Acid from Elemental Phosphorous, pp. 1-35 (Tennessee Valley Authority Jun. 1970).†

H.Y. Allgood et al., Superphosphoric Acid Plant, Industrial and Engineering Chemistry, vol. 59, pp. 18-28 (Jun. 1967).†

J.H. Walthall and M.M. Striplin, Superphosphoric Acid by Absorption of Phosphorus Pentoxide Vapor, Industrial and Engineering Chemistry, vol. 33, No. 8, pp. 995-1000 (Aug. 1941).†

M.M. Striplin, Chemical Engineering Report No. 2, Development of Processes and Equipment for Production of Phosphoric Acid, Wilson Dam, Alabama, pp. 69-70 (Tennessee Valley Authority 1948).†

Leder et al., New Process for Technical-Grade Phosphoric Acid, in Ind. Eng. And Chem. Process Design and Development 24(3), pp. 688-697 (American Chemical Society 1985).†

* cited by examiner
† cited by third party

PHOSPHORUS ABSORPTION BY HYDRATION AND FLUORINE RECOVERY FOR FUME EXITING KILN IN KILN PHOSPHORIC ACID PROCESS

CROSS-REFERENCE TO RELATED APPLICATIONS

The application is a continuation in part of PCT/CN2013/081225 (filed on Aug. 9, 2013), which claims priority of CN Patent Application Serial No. 201310218625.0 (filed on Jun. 4, 2013) the contents of which are incorporated herein by reference in their entirety.

TECHNICAL FIELD

The present invention is related to a process method for production of phosphoric acid and fluorine recovery from fume containing $P_2O_5$ and fluorine, particularly a process method for production of phosphoric acid by phosphorus absorption by hydration and fluorine recovery for fume exiting kiln in kiln phosphoric acid process (KPA).

BACKGROUND

There are chiefly two processes for producing phosphoric acid in industry. (1) producing phosphoric acid with a wet process: using sulfuric acid to decompose phosphate ore to obtain dilute phosphoric acid and solid slag (briefly called phosphogypsum) with $CaSO_4.nH_2O$ as a main component, and concentrating the dilute phosphoric acid to obtain wet-process phosphoric acid with about 54% phosphoric acid. This process has the following major drawbacks: the first drawback is large consumption of sulfuric acid; the second drawback is that the slag phosphogypsum cannot be used effectively, and sulfuric acid, phosphoric acid and soluble fluorides entrained therein are all soluble in water, and rain wash of the slag piled in the nature is apt to cause serious pollution to the environment; the third drawback is that the resultant phosphoric acid contains higher contain of impurities and is generally only used to produce fertilizer; and the fourth drawback is that high-grade phosphate ore must be used to ensure economy of the product. (2) producing phosphoric acid with a hot process: first, placing phosphate ore, silica and carbonaceous solid reductant in an ore-smelting electric furnace, raising a temperature in the furnace to 1300° C. with energy of electric arc formed by electrical short-circuiting, reducing phosphor in the phosphate ore in the form of $P_4$, meanwhile converting carbonaceous solid reductant into CO, washing gas mainly containing $P_4$ and CO discharged out of the ore-smelting electric furnace with water, cooling $P_4$ into solid to separate from gas phase to obtain the product yellow phosphorus, igniting and burning exhaust gas containing CO at an outlet of a chimney and exhausting to the atmosphere; heating the obtained $P_4$ to 80° C. to change it into liquid phase, subjecting it to oxidization combustion reaction with introduced air in a hydration tower to obtain phosphoric anhydride $P_2O_5$, and then absorbing it with water to obtain phosphoric acid. The hot-process production of phosphoric acid has the following main drawbacks: the first drawback is large consumption of electrical energy; the second drawback is that gas discharged out of the ore-smelting electric furnace, from which $P_4$ is already separated, still entrains a large amount of fluorides (existing in the form of $SiF_4$ and HF) and a small amount of un-deposited gas $P_4$, which causes serious pollution to the atmospheric environment; the third drawback is that gas containing a large amount of CO is directly burnt and exhausted, which causes large waste of energy: the fourth drawback is that high-grade phosphate ore needs to be used to ensure economy of the production.

To overcome impact on production of phosphoric acid exerted by shortage of electrical energy, insufficient pyrites resources and gradual reduction of high-grade phosphate core, Occidental Research Corporation of the United States proposed a KPA process in 1980's, i.e., a process of producing phosphoric acid with a rotary kiln (briefly called a phosphoric acid producing process with a kiln) (see Frederic Ledar and Won C. Park, et al., New Process for Technical-Grade Phosphoric Acid, Ind. Eng. Chem. Process Des. Dev 1985, 24, 688-697), and carried out a pilot experiment of a pilot device in a 0.84 m (inner)×9.14 m (see the US patent document U.S. Pat. No. 4,389,384). According to this process, phosphate ore, silica and carbonaceous reductant (coke powder or coal powder) are co-ground so that 50%-85% of the co-ground materials passes a −325 mesh, with 1% bentonite being added to produce balls, which are dried and preheated by a chain-type dryer and then delivered into a rotary kiln with a kiln head in which natural gas is burnt, pellets are reduced in the kiln, a maximum solid temperature is controlled as 1400-1500° C., pellet $CaO/SiO_2$ mole ratio is adjusted as 0.26-0.55 so that the a melting point of the pellet is higher than a carbon thermal reduction temperature of the phosphate core in the pellets, phosphor is reduced and volatiles out of the pellets in the form of phosphoric vapor, and then oxidized by air introduced in a middle space of the kiln into phosphorous pentoxide, heat resulting from oxidization is then supplied to the reduction reaction, and finally kiln gas containing phosphorous pentoxide is hydrated and absorbed to obtain phosphoric acid.

The idea of the above processing phosphoric acid with a kiln exhibits an excellent industrial application prospect because its principle is to form $P_4$ gas using carbon thermal reduction of the phosphate ore, transfer phosphorus in the phosphate ore to gas phase of the rotary kiln, use a gas-solid separation principle to enable phosphorus to be well separated from other solid substances in the balls, allow the $P_4$ gas transferred into the gas phase of the rotary kiln to go through an oxidization heat liberation reaction with oxygen in the gas phase of the rotary kiln to generate $P_2O_5$, supply the liberated heat to carbon thermal reduction (endothermic reaction) of the phosphate ore in the material balls, and finally hydrate and absorb the kiln gas containing $P_2O_5$ exiting the rotary kiln to obtain industrial phosphoric acid having a cleanliness much higher than the phosphoric acid produced with the wet process. Since the rotary kiln uses primary energy to maintain phosphate ore carbon terminal reduction temperature, and meanwhile flammable substance $P_4$ generated from the phosphate ore carbon terminal reduction and CO are subjected to the combustion heat liberation reaction in the interior of the rotary kiln to replenish the energy needed to maintain the phosphate ore carbon terminal reduction temperature in the rotary kiln, this process substantially reduces energy consumption as compared with the conventional hot process of producing phosphoric acid. However, the research indicates that it is very difficult to implement the process of producing phosphoric acid with the kiln in large-scale industrial application and practice and its main drawbacks are as follows:

1. A rotary kiln is an apparatus with a kiln body rotating at a certain speed (0.5 r/min-3 r/min), and it is advantageous in continuously performing mechanical turn and mixture of a solid material fed into the kiln to ensure uniformity of heat reception of the solid material at all locations in the kiln.

However, the solid material in the kiln must bear a mechanical frictional force resulting from movement of the material. If a strength of the material is smaller than the received mechanical frictional force, the material can be easily destroyed. A basic principle of the KPA process proposed by ORC corporation of the United States is to co-grind the phosphate ore, the silica and the carbonaceous reductant (coke powder or coal powder) so that 50%-80% of the co-ground materials passes 325 mesh, and then produce them into pellets, the three kinds of substances must be closely copolymerized into a whole so that the mixture does not melt at the carbon thermal reduction temperature of the phosphate ore under the condition the $CaO/SiO_2$ mole ratio in the mixture is 0.26-0.55, and meanwhile carbon reduction of the phosphate ore can be performed smoothly. However, since the reductant carbon is added to the material pellets used in the process, carbon goes through quick oxidization reaction with oxygen in air at a temperature greater than 350° C. to produce $CO_2$. If a conventional method of consolidating pellets at a high temperature ($\geq$900° C.) at a chain grate in the metallurgical industry is employed, the reducing carbon in the pellets will be all oxidized, the pellets entering the rotary kiln will lose the reductant, carbon thermal reduction reaction of the phosphorus naturally cannot be performed, and the process fails as a result. If only the bentonite is added as a bonding agent of the pellets to perform drying and dehydration at a temperature less than 300° C., an anti-pressure strength of the pellets is only about 10 KN per ball, with a falling strength $\leq$1 time per meter since an acting mechanism of the bentonite is mainly to use interlayer water in its substance structure to adjust a moisture content release speed during the drying of the pellets and improve a burst temperature of the pellets during the drying, and bentonite itself does not play a remarkable role in improving the strength of the pellets. After such pellets are fed into the rotary kiln and before the rotary kiln temperature value reaches 900° C., since the pellets entering the kiln cannot bear the mechanical frictional force resulting from movement of material balls in the pellets, a lot of said pellets are pulverized, and thereafter the phosphate ore powder, silica powder and carbonaceous reductant forming the pellets will separate, the phosphate ore powder after pulverization causes failure of reduction of phosphorus as it cannot get in close contact with carbonaceous reductant. More seriously, once the phosphate ore powder separates from silica powder, its melting point abruptly falls below 1250° C. When such powder-like phosphate ore passes through a high-temperature reducing area (with a material layer temperature of 1300° C. or so) of the rotary kiln, it will totally changes from solid phase into a liquid phase, and thereby adheres to a liner of the rotary kiln to form high-temperature ringing of the rotary kiln, which hinders normal rotation of the materials in the rotary kiln so that a majority of materials added into the rotary kiln overflows from the rotary kiln from a feeding end of the rotary kiln, high-temperature reduction of phosphorus cannot be achieved and the process fails. It can be seen that the raw materials entering the kiln have their intrinsic drawbacks, any industrialized, large-scale or commercialized application of the above-mentioned KPA technology has not yet been witnessed so far.

2. Regarding the KPA process with the phosphate ore pellets with carbon being added, a solid material area below a material layer in the rotary kiln belongs to a reduction zone, and a gas flow area of the rotary kiln is above the material layer and belongs to an oxidization zone, the feed pellets are added from a kiln tail of the rotary kiln and discharged out of a kiln head of the rotary kiln by virtue of its own gravity and a frictional force resulting from rotation of the rotary kiln, a burner for burning fuel in the rotary kiln is mounted at the kiln head of the rotary kiln, fume resulting from the burning is introduced out by a blower at the kiln tail, a micro negative pressure is maintained in the rotary kiln, and the gas flow is opposite to a movement direction of the materials. Since there is not a mechanical isolation area between the reduction zone (solid material layer area) and the oxidization zone (the gas flow area above the solid material layer area of the rotary kiln) of the rotary kiln, the material balls exposed on the surface of the solid material layer area and $O_2$, $CO_2$ in the gas flow in the oxidization zone are subjected to convective mass transfer; on the one hand, this causes the reductant in the material balls to be partially oxidized before the material balls are heated by the gas flow heat transfer to the carbon reduction temperature of the phosphate ore so that the material balls are not sufficiently reduced due to shortage of carbonaceous reductant in the reduction zone of the rotary kiln; more seriously, the material balls exposed to the surface of the material layer at the high-temperature area of the rotary kiln is further subjected to chemical reaction with $P_2O_5$ already generated from reduction in the kiln gas to produce calcium metaphosphate, calcium phosphate and other metaphosphates or phosphates, thereby causing the phosphorus already reduced into the gas phase to return to the material balls again and form a layer of white crust rich in $P_2O_5$ on the surface of the material balls, the layer of crust generally having a thickness of 300 μm-1000 μm, the content of $P_2O_5$ in the layer of crust topping 30%; as a result, $P_2O_5$ transferred from the material balls to the gas phase does not exceed 60%, which cause a lower yield ratio of $P_2O_5$ in the phosphate ore and thereby causes waste of mineral resources and large rise of the phosphoric acid production cost so that the above KPA process losses value in respect of commercial application and industrial spread. Researchers desire gas volatized from the material layer to isolate the reduction zone from the oxidization zone in the rotary kiln, but industrial experiments performed in a rotary kiln with an inner diameter 2 m show that the phenomena of white crust rich in $P_2O_5$ on the surface of the pellets still cannot be avoided.

Due to the above-mentioned technical drawbacks, it is still very difficult to use the KPA process proposed by ORC Corporation in large-scale industrial application and practice to produce phosphoric acid.

Joseph A. Megy proposes some improved technical methods with respect to the KPA process (see US patent document U.S. Pat. No. 7,910,080B), i.e., on the premise of maintaining the basis process of KPA unchanged, providing a material stopping ring on a kiln head material discharging end of the cylinder of the rotary kiln to improve a solid material filling rate of the rotary kiln, and meanwhile increasing the diameter of the rotary kiln to reduce a surface area to volume ratio of an inner material layer of the rotary kiln, reduce probability of the material of the material layer being exposed to the surface of the solid material layer to shorten the time that the reductant carbon in the material balls is oxidized by $O_2$ in the kiln gas in the rotary kiln, reduce burn of the reductant carbon before the material balls reach the reduction zone of the rotary kiln and meanwhile decease generation of phosphates or metaphosphates on the surface of the material balls in the high-temperature area of the rotary kiln. In addition, according to the process, it is desired that partial petroleum coke is added to the materials entering the rotary kiln so that reducing gas generated by a volatile matter in the petroleum coke due to heat reception and volatilization is used to cover between the material layer and the gas flow oxidization area of the rotary kiln to further block the probability of the $O_2$ and $P_2O_5$ in the gas flow in the rotary kiln reacting with the material balls to ensure normal operation of the process. However, increase of the filling rate of the rotary kiln allows the material balls to bear larger mechanical frictional force in the rotary kiln, thereby causing a larger proportion of pulverization of the material balls in the rotary kiln, and forming more substances with a melting point lower than the phosphate ore carbon thermal reduction temperature so that the high-temperature ringing of the rotary kiln becomes quicker and more serious and earlier failure of the process is caused. In addition, the volatile matter generated by added small amount of petroleum coke is not sufficient to produce sufficient gas and it is difficult to form an effective isolation layer between the solid material layer of the rotary kiln and the gas flow area in the rotary kiln. If an excessive amount is added, the materials in the rotary kiln will entrain a large amount of fuel so that in a slag ball cooling machine in the subsequent process, the redundant fuel is confronted with the air for cooling the slag balls and burns rapidly, a large amount of heat resulting from the burning not only increases the difficulty in cooling the high-temperature slag balls exiting the rotary kiln but also substantially increases the production cost of the process and makes implementation of the commercialized and large-scale application of the process impossible. However, in the course of the subsequent study, the inventors discovered a series of new technical problems and some exist in the process for absorption of phosphorus by hydration and fluorine recovery in KPA. The process for absorption of phosphoric acid by hydration in KPA mainly drew on the experience of the method of absorption of phosphoric acid in hot process for production of phosphoric acid, however, the fume exiting the kiln in KPA is very different from the fume produced by combustion of yellow phosphorus in hot process for production of phosphoric acid and the differences are as follows: firstly, the concentration of $P_2O_5$ in fume exiting the kiln is lower, and with the same yield of fume, the concentration of $P_2O_5$ in the fume produced in former process is 3 to 4 times that of latter process; secondly, the fume exiting the kiln is variable in composition, consisting of fluorine, dust, $SO_2$ and other impurities. The application of method for absorption of phosphoric acid in hot process may causes the following problems: firstly, the lower production of fume produced in hot process results in a lower flow rate of fume in the corresponding equipment, and if this method for absorption of phosphoric acid in hot process is used in KPA, the equipment system in the latter process will get a quite large size, a complex structure and an increased cost of investment and operating; secondly, the variable impurities in fume produced in KPA require a spraying acid with a higher corrosion, and the process and device for absorption of phosphoric acid is necessary to be further improved to prevent the solid impurities in acid from blocking the equipment and pipeline; more importantly, the fluorine-containing substance (exists in form of $SiF_4$ and HF) in fume exiting the kiln in KPA which is harmful to human needs to be recovered to avoid contamination of environment.

Therefore, for the reduced cost of production and operating expense of KPA, guaranteed quality of phosphoric acid product, full utilization of resources, and avoidance of environmental pollution, a further study of the device and process for fluorine recovery from fume after phosphorus absorption by hydration in KPA is necessary for more realistic solutions.

SUMMARY

The technological problem to be solved by present invention is directed to the fume exiting the kiln in KPA containing $P_2O_5$, $SiF_4$, HF and dust. The present invention provides a method for phosphorus absorption by hydration and fluorine recovery for the fume exiting the kiln in KPA, and the method has the advantages of a simplified process flow, a reasonable layout, a low equipment investment cost, a strong adaptability, a high recycling rate for valuable elements, a exhausted waste gas meeting environmental standards, and good recovery effects for both phosphorus and fluorine.

To solve the technical problem described above, the present invention provides a method for phosphorus absorption by hydration for the fume exiting the kiln in KPA comprising the following steps:

(1) introducing a fume exiting the kiln containing $P_2O_5$ and fluorine into a hydration tower, and feeding concentrated phosphoric acid solution into a spraying device in the hydration tower by an acid solution circulating and spraying system, contacting the sprayed concentrated phosphoric acid solution with the fume exiting the kiln which contains $P_2O_5$ and fluorine in the tower for heat transfer and mass transfer, forming phosphoric acid after chemical reaction between $P_2O_5$ in the fume and the water in the spayed concentrated phosphoric acid, and absorbing most of phosphoric acid obtained in the chemical reaction by the spraying liquid and remaining the rest in the gas phase in form of phosphoric acid mist, discharging the remaining fume in hydration tower from a fume outlet; (2) introducing the phosphoric acid solution sprayed and falling down in the hydration tower into the acid solution circulating and spraying system and then into an acid cooler, pumping the sprayed phosphoric acid solution flowing from an outlet of acid cooler back to the spraying device in the hydration tower for circulating and spraying again; (3) introducing the fume discharged out of the fume outlet through a phosphoric acid mist capturing tower and a mist removing and separating tower for further capture of the phosphoric acid mist in the fume, forming a dilute phosphoric acid solution after capture of the phosphoric acid mist by phosphoric acid mist capturing tower and mist removing and separating tower, keeping crossflow of the dilute phosphoric acid solution with concentrated phosphoric acid solution in the hydration tower via pipeline arrangement; (4) during the above operation, the concentrated phosphoric acid solution in acid solution circulating and spraying system keeps increasing, filtering the surplus part of concentrated phosphoric acid solution and forming a crude phosphoric acid product, and then introducing the crude phosphoric acid product to a subsequent phosphoric acid refining procedure.

The present invention also provides a method for phosphorus absorption by hydration and fluorine recovery for the fume exiting the kiln in KPA, the method which is on the basis of the technical solution described above further employs a fluorine recovery procedure comprising the following steps:

(1) primary fluorine absorption: firstly conveying the fluorine-containing fume discharged out of the mist removing and separating tower to a fluorosilicic acid washing pipe in a primary fluorine absorption tower, completely contacting the fume flowing from up to down with circulating fluorosilicic acid sprayed from down to up by a nozzle, forming fluorosilicic acid after the mass transfer, heat transfer and chemical reaction between the fume and circulating fluorosilicic acid, at the same time, transferring a portion of enthalpy in the fume into the steam by adiabatic evaporation of water in circulating fluorosilicic acid solution;

(2) primary gas-liquid separation: conveying the gas and liquid in the fluorosilicic acid washing pipe to a fluorosilicic acid separation tank for gas-liquid separation, and introducing the gas obtained by separation to a secondary fluorosilicic acid washing pipe of a secondary fluorine absorption tower via a fume outlet of primary fluorine absorption tower, and remaining the liquid obtained by separation in the fluorosilicic acid separation tank, and then conveying the liquid back to fluorosilicic acid washing pipe for the operation in step (1) via a circulating and conveying pipeline which has a circulating pump;

(3) the secondary fluorine absorption: completely contacting the fume flowing from up to down in the secondary fluorosilicic acid washing pipe with circulating fluorosilicic acid sprayed from down to up by a nozzle, forming fluorosilicic acid after the mass transfer, heat transfer and chemical reaction between the fume and circulating fluorosilicic acid, at the same time, the enthalpy in the fume is partially transferred into circulating fluorosilicic acid solution by heat transfer;

(4) the secondary gas-liquid separation: conveying the gas and liquid in the secondary fluorosilicic acid washing pipe to a secondary fluorosilicic acid separation tank for gas-liquid separation, and introducing the gas obtained by separation to a tail gas absorption tower for further process via a fume outlet of secondary fluorine absorption tower, and remaining the liquid obtained by separation in the fluorosilicic acid separation tank, conveying a part of the liquid described above back to secondary fluorosilicic acid washing pipe for the operation in step (3) by a circulating pump and conveying another part thereof to fluorosilicic acid separation tank of primary fluorine absorption tower;

(5) the fluorosilicic acid solution in primary fluorine absorption tower keep increasing and filtering the extra fluorosilicic acid solution for removing of silica gel and forming a byproduct of fluorosilicic acid.

LISTING OF REFERENCE NUMBERS

Figure 1:
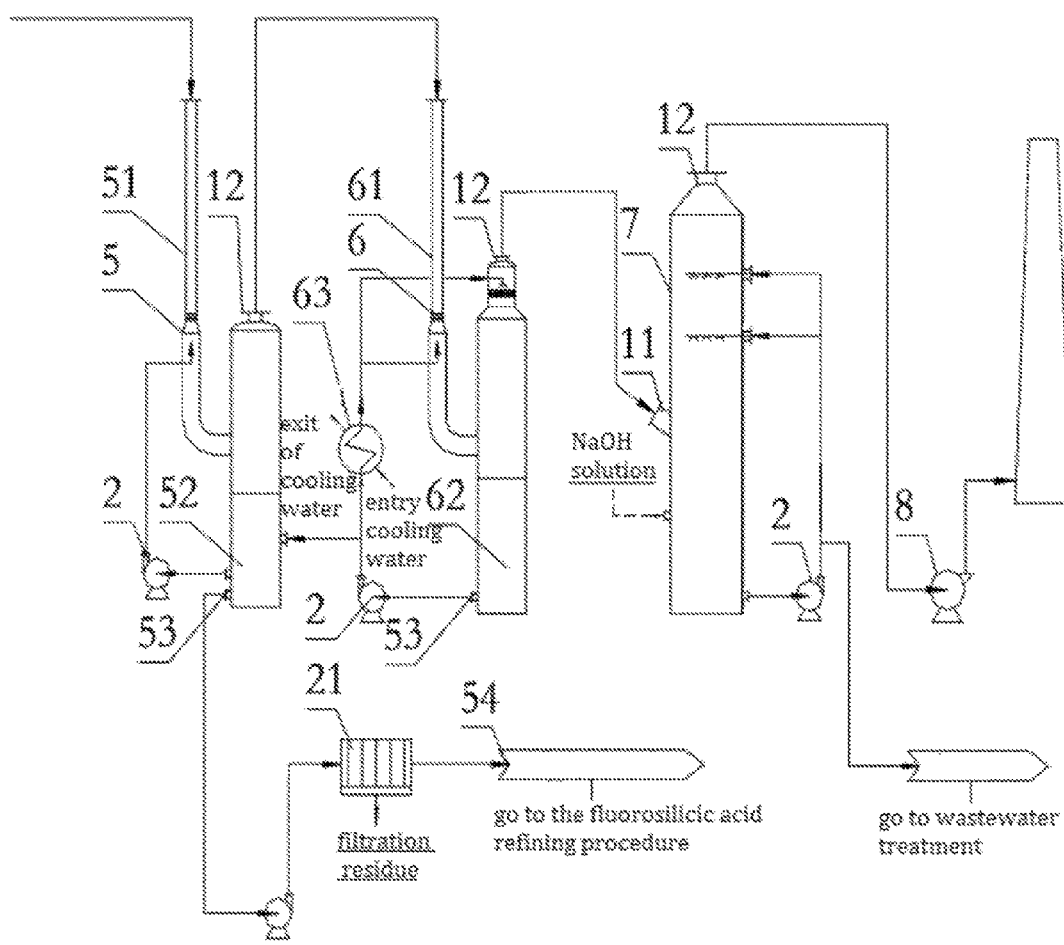
FIG. 1 illustrates a structural schematic view of a device for fluorine recovery according to a specific embodiment of the present invention.

The reference number 1 denotes a hydration tower; 11 a fume inlet; 12 a fume outlet; 13 a spraying device; 14 a liquid inlet; 15 a liquid outlet; 16 an acid storage tank; 17 a water-cooling system; 18 an acid cooler; 2 a circulating pump; 21 a pressure filter; 22 a packing filter; 23 a phosphoric acid refining equipment; 24 a concentrated phosphoric acid spraying layer; 25 a dilute phosphoric acid spraying layer; 3 a phosphoric acid mist capturing tower; 31 a washing pipe; 32 a separation tank; 33 an acid outlet; 34 an acid inlet; 35 a nozzle; 4 a mist removing and separating tower; 41 a online water flushing device; 42 a mesh demister; 43 a phosphoric acid liquid drop capturing structure; 5 a primary fluorine absorption tower; 51 a fluorosilicic acid washing pipe; 52 a fluorosilicic acid separation tank; 53 a fluorosilicic acid liquid outlet; 54 a fluorosilicic acid refining equipment; 6 a secondary fluorine absorption tower; 61 a secondary fluorosilicic acid washing pipe; 62 a secondary fluorosilicic acid separation tank; 63 a fluorosilicic acid cooler; 7 a tail gas absorption tower; 8 a draught fan.

DETAILED DESCRIPTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context dearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context dearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

The present invention provides a method for phosphorus absorption by hydration for the fume exiting the kiln in KPA comprising the following steps:

(1) introducing a fume exiting the kiln containing $P_2O_5$ and fluorine into a hydration tower, and feeding concentrated phosphoric acid solution into a spraying device in the hydration tower by an acid solution circulating and spraying system, counter-flow contacting the downwardly sprayed concentrated phosphoric acid solution with the fume exiting the kiln which contains $P_2O_5$ and fluorine in the tower for heat transfer and mass transfer, forming phosphoric acid after chemical reaction between $P_2O_5$ in the fume and the water in the spayed concentrated phosphoric acid, and absorbing most of phosphoric acid obtained in the chemical reaction by the spraying liquid and remaining the rest in the gas phase in form of phosphoric acid mist, discharging the remaining fume in hydration tower from a fume outlet;

(2) introducing the phosphoric acid solution sprayed and falling down in the hydration tower into the acid solution circulating and spraying system and then into an acid cooler, pumping the sprayed phosphoric acid solution flowing from an outlet of acid cooler back to the spraying device in the hydration tower for circulating and spraying again;

(3) introducing the fume discharged out of the fume outlet through a phosphoric acid mist capturing tower and a mist removing and separating tower for further capture of the phosphoric acid mist in the fume, forming a dilute phosphoric acid solution after capture of the phosphoric acid mist by phosphoric acid mist capturing tower and mist removing and separating tower, keeping crossflow of the dilute phosphoric acid solution with concentrated phosphoric acid solution in the hydration tower via pipeline arrangement;

(4) during the above operation, the concentrated phosphoric acid solution in acid solution circulating and spraying system keeps increasing, filtering the surplus part of concentrated phosphoric acid solution and forming a crude phosphoric acid product, and then introducing the crude phosphoric acid product to a subsequent phosphoric acid refining procedure.

In an embodiment of the present invention, the step (1) of the method comprising: turning on an acid solution circulating and spraying system connected with a hydration tower, introducing a fume exiting the kiln containing $P_2O_5$ and fluorine into the hydration tower, and continuously feeding concentrated phosphoric acid solution into a spraying device in the hydration tower by the acid solution circulating and spraying system, counter-flow contacting the downwardly sprayed concentrated phosphoric acid solution with the fume exiting the kiln which contains $P_2O_5$ and fluorine in the tower completely for heat transfer and mass transfer (the temperature of the fume is reduced because of the heat transfer between fume and circulating and spraying concentrated phosphoric acid solution), forming phosphoric acid after chemical reaction between $P_2O_5$ in the fume and the water in the spayed concentrated phosphoric acid, and absorbing most of phosphoric acid obtained in the chemical reaction by the spraying liquid and remaining the rest in the gas phase in form of phosphoric acid mist, at the same time the fluorine-containing substances (mainly in form of $SiF_4$ and HF) in the fume exiting the kiln is difficult to be absorbed by the spraying liquid in the hydration tower, discharging the remaining fume in hydration tower from a fume outlet; In an embodiment of the present invention, the step (2) of the method comprising: introducing the phosphoric acid solution sprayed and falling down in the hydration tower into the acid solution circulating and spraying system via a liquid inlet and then into an acid cooler, transferring a portion of enthalpy in phosphoric acid solution to the circulating and cooling water in the acid cooler, and constantly transferring the heat in the phosphoric acid solution by cooling water, pumping the sprayed phosphoric acid solution flowing from an outlet of acid cooler by a circulating pump back to the spraying device in the hydration tower for circulating and spraying again;

In an embodiment of the present invention, the step (3) of the method comprising: introducing the fume discharged out of the fume outlet through a phosphoric acid mist capturing tower and a mist removing and separating tower successively for further capture of the phosphoric acid mist in the fume, forming a dilute phosphoric acid solution after capture of the phosphoric acid mist by phosphoric acid mist capturing tower and mist removing and separating tower, keeping crossflow of the dilute phosphoric acid solution with concentrated phosphoric acid solution in the hydration tower via pipeline arrangement; the acid crossflow described above preferably refers to: pumping the dilute phosphoric acid solution captured by phosphoric acid mist capturing tower and mist removing and separating tower to the hydration and then mixing with concentrated phosphoric acid solution in hydration tower to maintain a stable concentration of acid in acid solution circulating and spraying system in hydration tower at the same time, drawing out a part of concentrated phosphoric acid solution in acid solution circulating and spraying system in hydration tower and then clarifying by a filtering device, a part of supernatant obtained after clarifying is conveyed to the phosphoric acid mist capturing tower for acid crossflow to maintain a stable concentration of acid, and another part of supernatant obtained after clarifying is conveyed back to an acid storage tank in hydration tower;

In an embodiment of the present invention, the step (4) of the method comprising: during the above operation, the concentrated phosphoric acid solution in acid solution circulating and spraying system keeps increasing, filtering the surplus part of concentrated phosphoric acid solution and forming a crude phosphoric acid product, and then introducing the crude phosphoric acid product to a subsequent phosphoric acid refining procedure; on the other hand, online supplying water for the entire process by an online water supplying device, introducing the fume out of the outlet of the mist removing and separating tower to a subsequent fluorine recovery procedure.

In an embodiment of the present invention, the spraying device in the hydration tower comprises at least two spraying layers located at different heights in a chamber of the hydration tower, and the spraying layers comprises at least a dilute phosphoric acid spraying layer and a concentrated phosphoric acid spraying layer, and the concentrated phosphoric acid spraying layer is located above the dilute phosphoric acid spraying layer.

In an embodiment of the present invention, a liquid inlet pipe of the concentrated phosphoric acid spraying layer is connected to the acid solution circulating and spraying system, a liquid inlet pipe of the dilute phosphoric acid spraying layer is connected to a circulating and conveying pipeline for dilute phosphoric acid solution in the phosphoric acid mist capturing tower to enable the dilute phosphoric acid solution in phosphoric acid mist capturing tower to be conveyed to hydration tower for acid crossflow, the acid solution circulating and spraying system is connected to the phosphoric acid mist capturing tower via another pipeline to enable the circulating phosphoric acid in the hydration tower to be conveyed to the phosphoric acid mist capturing tower for acid crossflow.

In an embodiment of the present invention, the acid cooler is structured in a way that a plurality of heat exchange plates made of modified graphite pipes or stainless steel pipe are arranged in an agitation tank, circulating and cooling water is introduced in the pipes, through agitation the phosphoric acid solution entering the acid cooler forms forced convection and heat exchange on the heat exchange plates.

In an embodiment of the present invention, the temperature of the fume exiting the kiln in the step (1) is reduced to 75-130° C. because of the heat transfer between fume exiting the kiln and circulating phosphoric acid solution which is spraying cyclically and cooling by a water-cooling system in hydration tower.

In an embodiment of the present invention, the mass concentration of circulating and spraying phosphoric acid solution in hydration tower is 60%-90%, the temperature of concentrated phosphoric acid fed into the hydration tower is controlled to be 50-80° C., and the spraying liquid-gas ratio in hydration tower is controlled 1 $L/m^3$-20 $L/m^3$.

In an embodiment of the present invention, in the phosphoric acid refining procedure is provided a phosphoric acid refining tank for refining crude phosphoric acid product, active carbon, diatomite, desulfurizing agent and dearsenic agent are added into the phosphoric acid refining tank, pumping a product after reaction and stirring into filtration system for filtration, a filtrate obtained is end product of phosphoric acid.

In an embodiment of the present invention, the additive amount of both active carbon and diatomite are controlled as 0.1%-2% of the mass of crude phosphoric acid product to be refined; the desulfurizing agent is soluble barium salts with an additive amount of 1-2 times a theoretical amount (according to a chemical reaction equation); the dearsenic agent is hydrogen sulfide or sodium sulfide with an additive amount of 1-1.2 times a theoretical amount (according to a chemical reaction equation); the reaction in the phosphoric acid refining tank is stirred for 0.5 h-2 h.

In an embodiment of the present invention, the phosphoric acid mist capturing tower is a fluid-state counter-flow washing tower which mainly comprises a washing pipe and a separation tank, fume discharged out from the fume outlet of hydration tower enters the washing pipe of phosphoric acid mist capturing tower, the circulating dilute phosphoric acid sprayed from down to up in the washing pipe performs a counter-flow collision and contact with up-down fume flow to form a foam zone, the fume passes through the foam zone and contacts with large-area liquid surface of dilute phosphoric acid solution which updates constantly, and then capture and polymerization of phosphoric acid mist particles and heat transfer occurs in the foam zone, a temperature of the fume is further decreased to 60-90° C. by adiabatic evaporation of water in circulating dilute phosphoric acid solution; the gas and liquid in the washing pipe are transferred to the separation tank located at the lower part of the tower for gas-liquid separation, the separation tank is also used as a circulating acid tank (a circulating tank for dilute phosphoric acid solution), most the circulating phosphoric acid falling into the bottom of the separation tank is sent back to the washing pipe and a small part thereof is conveyed to the hydration tower for acid crossflow; the mass concentration of circulating and spraying dilute phosphoric acid solution in phosphoric acid mist capturing tower is 10%-50%; the temperature of dilute phosphoric acid solution is controlled as 40-70° C., and the spraying liquid-gas ratio in phosphoric acid mist capturing tower is controlled as 3 $L/m^3$-25 $L/m^3$. Most of the phosphoric acid mist in the fume discharged from the hydration tower is transferred into the circulating dilute phosphoric acid solution.

In an embodiment of the present invention, the fume discharged from the fume outlet in the phosphoric acid mist capturing tower enters the mist removing and separating tower for a further gas-liquid separation, a lower part of the mist removing and separating tower is designed to be a phosphoric acid liquid drop capturing structure which is similar to a cyclone duster, and the phosphoric acid liquid drop capturing structure captures the grown phosphoric acid liquid drop in the fume by centrifugation, an upper part of the mist removing and separating tower is provided with a mesh demister, and the phosphoric acid mist drop which is not grown up is further captured by the mesh demister; the online water supplying device is installed in the mist removing and separating tower and located at the position of the fume outlet above the mesh demister, on the one hand, the online water supplying device is water-supplying equipment for the entire process system, on the other hand, it is also used as a flushing device for the mesh demister with further capturing phosphoric acid mist in the fume by washing.

In an embodiment of the present invention, the present invention also provides a method for phosphorus absorption by hydration and fluorine recovery for the fume exiting the kiln in KPA, the method which is on the basis of the technical solution described above further employs a fluorine recovery procedure comprising the following steps:

(1) primary fluorine absorption: firstly conveying the fluorine-containing fume discharged out of the mist removing and separating tower to a fluorosilicic acid washing pipe in a primary fluorine absorption tower, completely contacting the fume flowing from up to down with circulating fluorosilicic acid sprayed from down to up by a nozzle, forming fluorosilicic acid after the mass transfer, heat transfer and chemical reaction between the fume and circulating fluorosilicic acid, at the same time, transferring a portion of enthalpy in the fume into the steam by adiabatic evaporation of water in circulating fluorosilicic acid solution;

(2) primary gas-liquid separation: conveying the gas and liquid in the fluorosilicic acid washing pipe to a fluorosilicic acid separation tank for gas-liquid separation, and introducing the gas obtained by separation to a secondary fluorosilicic acid washing pipe of a secondary fluorine absorption tower via a fume outlet of primary fluorine absorption tower, and remaining the liquid obtained by separation in the fluorosilicic acid separation tank, and then conveying the liquid back to fluorosilicic acid washing pipe for the operation in step (1) via a circulating and conveying pipeline which has a circulating pump;

(3) the secondary fluorine absorption: completely contacting the fume flowing from up to down in the secondary fluorosilicic acid washing pipe with circulating fluorosilicic acid sprayed from down to up by a nozzle, forming fluorosilicic acid after the mass transfer, heat transfer and chemical reaction between the fume and circulating fluorosilicic acid, at the same time, the enthalpy in the fume is partially transferred into circulating fluorosilicic acid solution by heat transfer;

(4) the secondary gas-liquid separation: conveying the gas and liquid in the secondary fluorosilicic acid washing pipe to a secondary fluorosilicic acid separation tank for gas-liquid separation, and introducing the gas obtained by separation to a tail gas absorption tower for further process via a fume outlet of secondary fluorine absorption tower, and remaining the liquid obtained by separation in the fluorosilicic acid separation tank, conveying a part of the liquid described above back to secondary fluorosilicic acid washing pipe for the operation in step (3) by a circulating pump and conveying another part thereof to fluorosilicic acid separation tank of primary fluorine absorption tower, (5) the fluorosilicic acid solution in primary fluorine absorption tower keep increasing and filtering the extra fluorosilicic acid solution for removing of silica gel and forming a byproduct of fluorosilicic acid.

In an embodiment of the present invention, the primary and secondary fluorine absorption tower are both fluid-state counter-flow washing towers, primary fluorine absorption tower mainly comprises the fluorosilicic acid washing pipe and the fluorosilicic acid separation tank, an outlet of the fluorosilicic acid washing pipe is connected to the middle part of the fluorosilicic acid separation tank, the top of the fluorosilicic acid separation tank is provided with a fume outlet, and at the bottom thereof a fluorosilicic acid liquid outlet is connected to a nozzle in the fluorosilicic acid washing pipe via a circulating and conveying pipeline which has a circulating pump;

In an embodiment of the present invention, the secondary fluorine absorption tower mainly comprises the secondary fluorosilicic acid washing pipe and the secondary fluorosilicic acid separation tank, a fume outlet of primary fluorine absorption tower is connected to the secondary fluorosilicic acid washing pipe via a pipeline, and an outlet of secondary fluorosilicic acid washing pipe is connected to the middle part of secondary fluorosilicic acid separation tank, the top of the secondary fluorosilicic acid separation tank is provided with a defoaming layer (the defoaming layer is sprayed and flushed by the circulating fluorosilicic acid regularly to keep the defoaming effect) and a fume outlet, and at the bottom thereof a fluorosilicic acid liquid outlet is in communication with a nozzle in the secondary fluorosilicic acid washing pipe and primary fluorosilicic acid separation tank via a circulating and conveying pipeline which has a circulating pump.

In an embodiment of the present invention, the circulating and conveying pipeline in secondary fluorine absorption tower is provided with a fluorosilicic acid cooler, the circulating fluorosilicic acid is cooled by the fluorosilicic acid cooler before entering the secondary fluorosilicic acid washing pipe.

In an embodiment of the present invention, the mass concentration of circulating fluorosilicic acid solution used in primary fluorine absorption is 8%-25%, the temperature of circulating fluorosilicic acid solution is 25-65° C., the spraying liquid-gas ratio is controlled as 3 L/m$^3$-25 L/m$^3$; the mass concentration of circulating fluorosilicic acid solution used in the secondary fluorine absorption is 0.5%-5%, the temperature of circulating fluorosilicic acid solution is 25-60° C., the spraying liquid-gas ratio is controlled as 3 L/m$^3$-25 L/m$^3$.

In an embodiment of the present invention, the mass concentration of circulating fluorosilicic acid solution used in primary fluorine absorption is 10%-20%, the temperature of circulating fluorosilicic acid solution is 50-65° C., the spraying liquid-gas ratio is controlled as 3 L/m$^3$-6 L/m$^3$; the mass concentration of circulating fluorosilicic acid solution used in the secondary fluorine absorption is 0.5%-5%, the temperature of circulating fluorosilicic acid solution is 45-60° C., the spraying liquid-gas ratio is controlled as 3 L/m$^3$-6 L/m$^3$.

In an embodiment of the present invention, the fume inlet of the secondary fluorine absorption tower is also connected to the tail gas absorption tower which is an empty spraying tower, the top of the tail gas absorption tower is provided with a fume outlet, and the upper part of inside thereof is provided with a spraying layer, and the bottom thereof is provided with an absorbing-alkali solution tank, an outlet of the absorbing-alkali solution tank is connected to the spraying layer in the tail gas absorption tower via a circulating and conveying pipeline which has a circulating pump, the pH value of the absorbing-alkali keeps not low than 8.

In the preferred embodiment of the present invention, the absorption of both P$_2$O$_5$ and fluorine in the fume exiting the kiln in KPA and an effective cooperation of process for phosphorus absorption by hydration and the process for fluorine recovery is achieved, a main product of phosphoric acid and byproduct of fluorosilicic acid obtained have a great value which ensures a much more effective utilization of raw material source and improvement of the economic benefits of KPA;

In the preferred embodiment of the present invention, the nearly zero emission of waste gas, waste materials and waste liquid makes the process more environmentally friendly;

Examples

Figure 3:
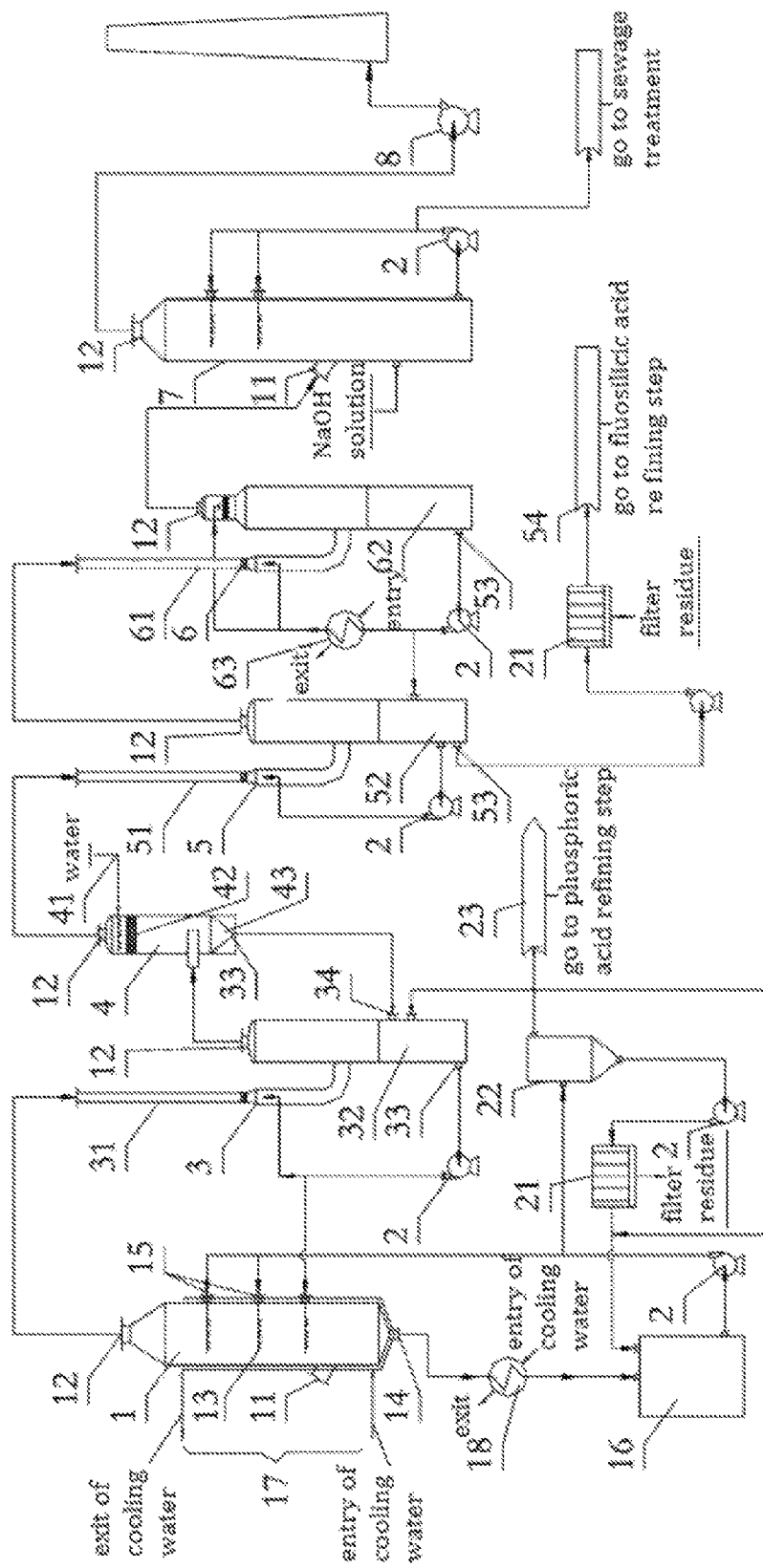
FIG. 3 illustrates a structural schematic view of a process system according to a specific embodiment of the present invention.

A method for phosphorus absorption by hydration and fluorine recovery for the fume exiting the kiln in KPA, the method according to the present embodiment makes use of a process system shown in FIG. 3, the process system comprises a system for production of phosphoric acid and a device for fluorine recovery.

In the present embodiment, the system for production of phosphoric acid comprises a hydration tower 1, an acid liquid circulating and spraying system, a phosphoric acid mist capturing tower 3 and a mist removing and separating tower 4.

The hydration tower 1 is an empty spraying tower, and the lower part of the hydration tower 1 is provided with a fume inlet 11 for the fume exiting the kiln, and the top thereof is provided with a fume outlet 12 for the fume after phosphorus absorption by hydration, and the bottom thereof is provided with a liquid inlet 14 of the acid solution circulating and spraying system, and an outlet 15 of the acid solution circulating and spraying system is connected to an inlet pipe of a spraying device 13 which is in a chamber above the fume inlet 11, and the acid solution circulating and spraying system is also provided with an acid storage tank 16 and a circulating pump 2. In the present embodiment, the outside wall of the chamber in hydration tower 1 is coated by a water-cooling system 17, and the cool water flows into the water-cooling system 17 through the inlet at the bottom and out through the outlet at the top. Additionally, the position near the liquid inlet 14 in the acid solution circulating and spraying system is provided with an acid cooler 18; and an outlet of the acid cooler 18 is connected to an inlet of the acid storage tank 16, and an outlet of the acid storage tank 16 is in communication with a liquid inlet of the spraying device 13 to form an acid solution circulating and spraying system.

Figure 5:
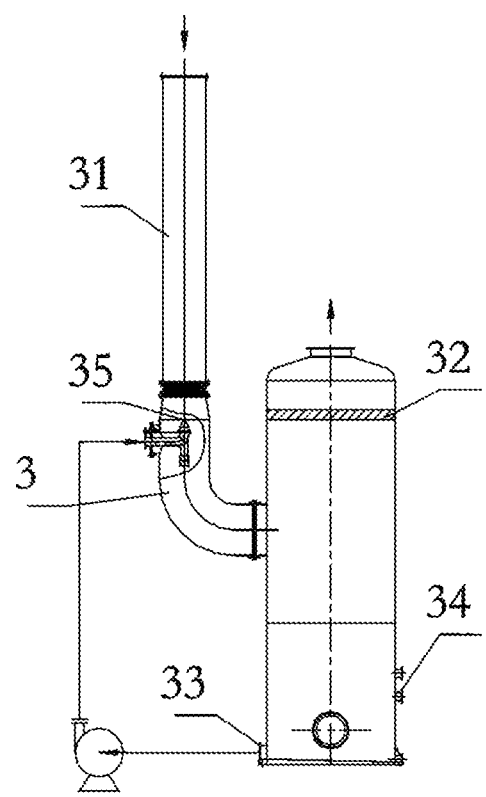
FIG. 5 illustrates an enlarged structural schematic view of a phosphoric acid mist capturing tower in device for the production of phosphoric acid according to a specific embodiment of the present invention.

The phosphoric acid mist capturing tower 3 is a fluid-state counter-flow washing tower which mainly comprises a washing pipe 31 and a separation tank 32, and an inlet and outlet of the washing pipe 31 are connected to a fume outlet 12 of the hydration tower 1 and the middle part of the separation tank 32, respectively, and the top of the separation tank is provided with a fume outlet 12, and at the bottom thereof an acid outlet 33 is connected to a nozzle 35 in washing pipe 31 via a circulating and conveying pipeline which has a circulating pump 2 (see FIG. 5), and the separation tank 32 is also used as an acid circulating tank for the circulating and conveying pipeline in the phosphoric acid mist capturing tower.

Figure 4:
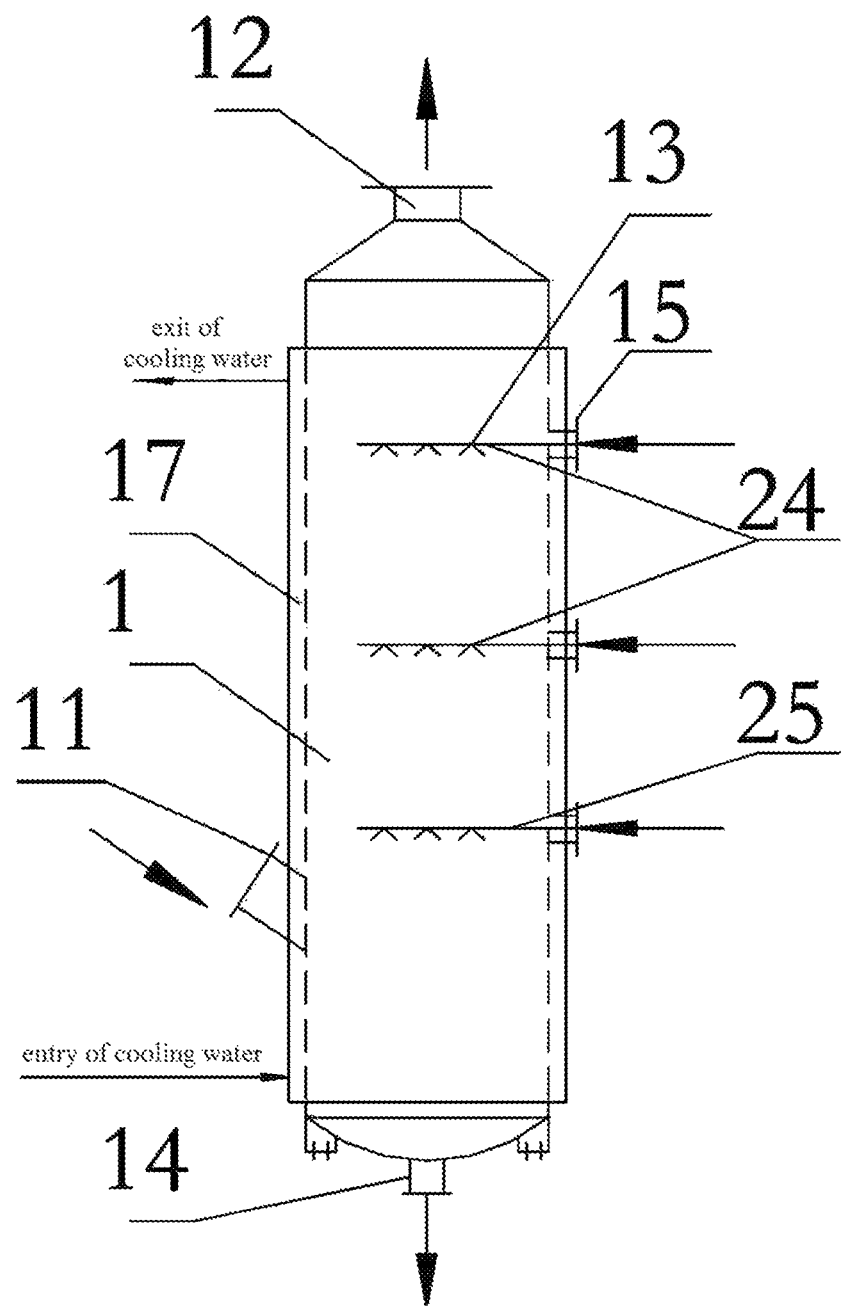
FIG. 4 illustrates an enlarged structural schematic view of a hydration tower in device for production of phosphoric acid according to a specific embodiment of the present invention.

For the acid crossflow between the hydration tower 1 and the phosphoric acid mist capturing tower 3, in the present embodiment, three spraying layers located at different heights in the chamber of the hydration tower 1 are installed in spraying device 13 in hydration tower 1, the said three spraying layers comprise a dilute phosphoric acid spraying layer 25 and two concentrated phosphoric acid spraying layers 24 (see FIG. 4), the concentrated phosphoric acid spraying layers 24 are located above the dilute phosphoric acid spraying layer 25; and a liquid inlet of the concentrated phosphoric acid spraying layers 24 is connected to an acid solution circulating and spraying system in the hydration tower 1, and a liquid inlet of the dilute phosphoric acid spraying layers 25 is in communication with a circulating and conveying pipeline in the phosphoric acid mist capturing tower 3 for acid crossflow from the phosphoric acid mist capturing tower 3 to the hydration tower 1. Additionally, a conveying pipeline behind the circulating pump 2 in the acid solution circulating and spraying system is connected to an acid inlet 34 of the phosphoric acid mist capturing tower 3 via a branch pipe. However, considering the connection of the process for filtration and purification of phosphoric acid, a packing filter 22 is installed on the branch pipe, and an acid inlet of the packing filter 22 is connected to the acid solution circulating and spraying system via the branch pipe, and an acid outlet of the packing filter 22 is divided into three paths: one is connected to an acid inlet 34 in the phosphoric acid mist capturing tower 3, and another one is in communication with the external phosphoric acid refining equipment 23, and the other is connected to an acid storage tank 16; and a underflow outlet of the packing filter 22 is connected to a feeding inlet of the pressure filter 21 via a pipeline, and a overflow outlet of the pressure filter 21 is in communication with the acid storage tank 16 in the acid solution circulating and spraying system to ensure the recovery and a high yield of phosphoric acid. The underflow in the packing filter 22 is pumped to the pressure filter 21 for filtration regularly to discharge the solid materials may be present in acid solution circulating and spraying system.

An fume outlet 12 of the phosphoric acid mist capturing tower 3 is connected to the lower part of the mist removing and separating tower 4, the top of the mist removing and separating tower 4 is provided with a fume outlet 12 which is used for discharging of the fume after phosphorus absorption by hydration, at the bottom thereof an acid outlet 33 is connected to an acid inlet 34 of the phosphoric acid mist capturing tower 3 via a pipeline. A online water flushing device 41 is installed in the mist removing and separating tower 4, and the water added into the online water flushing device is also used as supplied water to the entire process for production of phosphoric acid by hydration absorption, and the water returns to the phosphoric acid mist capturing tower 3 and the hydration tower 1 step-by-step via a pipeline. The upper part of the mist removing and separating tower 4 is installed with a mesh demister 42, and the lower part thereof is provided with a phosphoric acid liquid drop capturing structure 43 which is similar to a cyclone duster, and the online water flushing device 41 is installed above the mesh demister 42.

As shown in FIG. 1, a device for fluorine recovery used in the present embodiment comprises a primary fluorine absorption tower 5 and secondary fluorine absorption tower 6, which are both fluid-state counter-flow washing towers, primary fluorine absorption tower 5 mainly comprises a fluorosilicic acid washing pipe 51 and a fluorosilicic acid separation tank 52, an inlet and outlet of fluorosilicic acid washing pipe 51 are connected to a conveying pipeline of fume after phosphorus absorption by hydration and the middle part of the fluorosilicic acid separation tank 52, respectively, the top of the separation tank 52 is provided with a fume outlet 12, and at the bottom thereof a fluorosilicic acid liquid outlet 53 is connected to a nozzle 35 in the fluorosilicic acid washing pipe 51 via a circulating and conveying pipeline which has a circulating pump 2, the fluorosilicic acid separation tank 52 is also used as an acid circulating tank for the circulating and conveying pipeline. In the present embodiment, the main structure of the secondary fluorine absorption tower 6 is similar to that of primary fluorine absorption tower 5, which mainly comprises a secondary fluorosilicic acid washing pipe 61 and a secondary fluorosilicic acid separation tank 62, a fume outlet 12 of primary fluorine absorption tower 5 is connected to an inlet of secondary fluorosilicic acid washing pipe 61 via a pipeline and an outlet of fluorosilicic acid washing pipe 61 is connected to the middle part of secondary fluorosilicic acid separation tank 62, the top of the secondary fluorosilicic acid separation tank 62 is provided with a fume outlet 12, and at the bottom thereof a fluorosilicic acid liquid outlet 53 is in communication with a nozzle 35 in the secondary fluorosilicic acid washing pipe 61 via a circulating and conveying pipeline which has a circulating pump 2.

In the present embodiment, a circulating and conveying pipeline of secondary fluorine absorption tower 6 is provided with a fluorosilicic acid cooler 63, an inlet of the fluorosilicic acid cooler 63 is connected to a circulating pump 2, and an outlet is divided into two paths: one is connected to a nozzle 35 in the secondary fluorosilicic acid washing pipe 61 and another is in communication with a spraying layer at the top of secondary fluorosilicic acid separation tank 62, and secondary fluorosilicic acid separation tank 62 is also used as an acid circulating tank for the circulating and conveying pipeline. An outlet of the circulating pump 2 in secondary fluorine absorption tower 6 is connected to a liquid inlet of the fluorosilicic acid separation tank 52 in primary fluorine absorption tower 5 via a branch pipe, and thus the extra fluorosilicic acid in secondary fluorine absorption tower 6 can be transferred into primary fluorine absorption tower 5.

For the emission on standard of all pollutants, a tail gas absorption tower 7 which is an empty spraying tower is installed in the device for fluorine recovery according to the present embodiment, a fume inlet 11 of the tail gas absorption tower 7 is connected to a fume outlet 12 of the secondary fluorine absorption tower 6. The top of the tail gas absorption tower 7 is provided with a fume outlet 12, and the upper part of inside thereof is provided with a spraying layer, and the bottom thereof is provided with an absorbing-sodium hydroxide solution tank, an outlet of the absorbing-sodium hydroxide solution tank is connected to spraying layers in the tail gas absorption tower 7 via a circulating and conveying pipeline which is provided with a circulating pump 2 to from a circulating and spraying system for the absorption of the tail gas.

The fluorosilicic acid liquid outlet 53 is connected to an external fluorosilicic acid refining equipment 54 (or fluoride salts processing equipment) via a pipe which has a feeding pump, the fluorosilicic acid may be pressure filtered by a pressure filter 21 before flowing into the fluorosilicic acid refining equipment 54, and an overflow outlet of the pressure filter 21 is connected to the fluorosilicic acid refining equipment 54.

Figure 2:
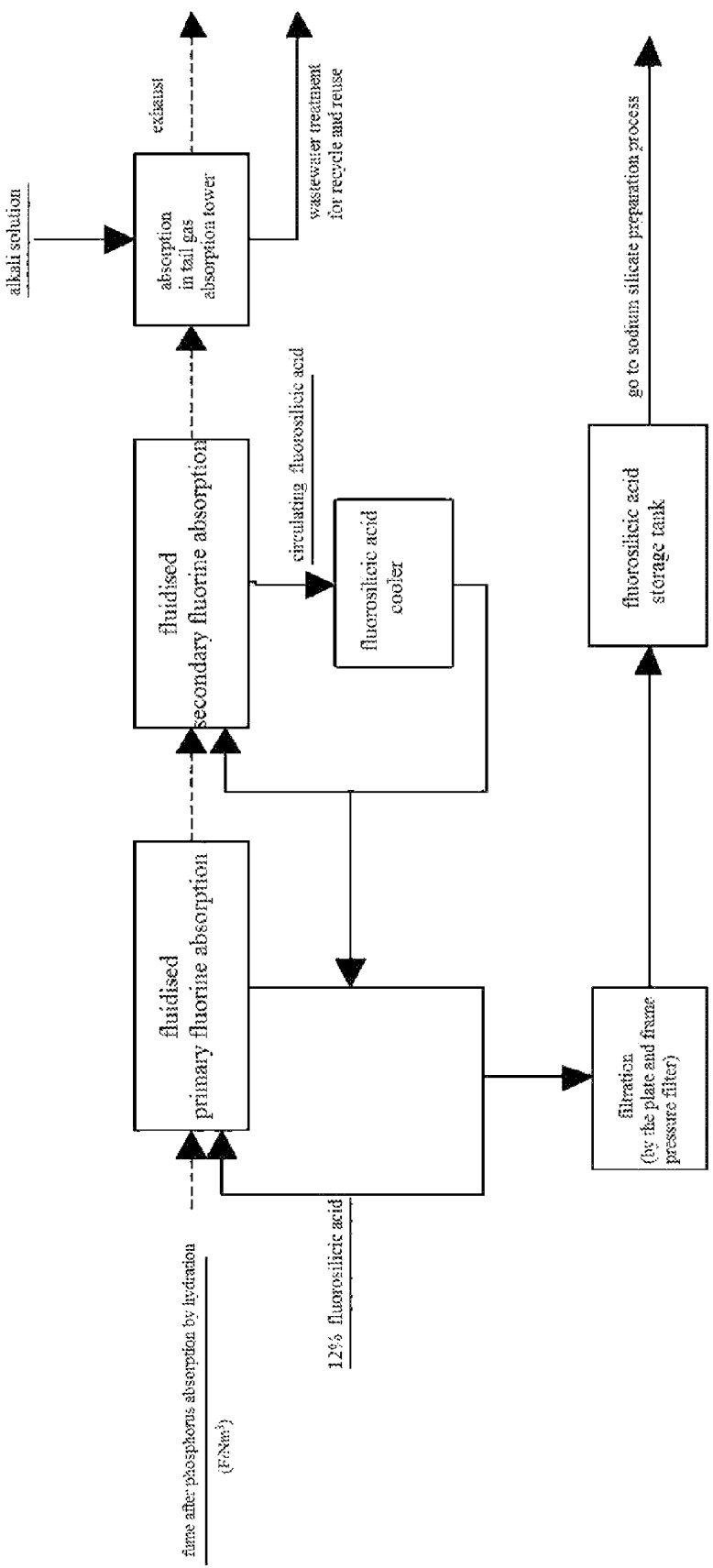
FIG. 2 illustrates a flow chart of a process for fluorine recovery according to a specific embodiment of the present invention.
Figure 6:
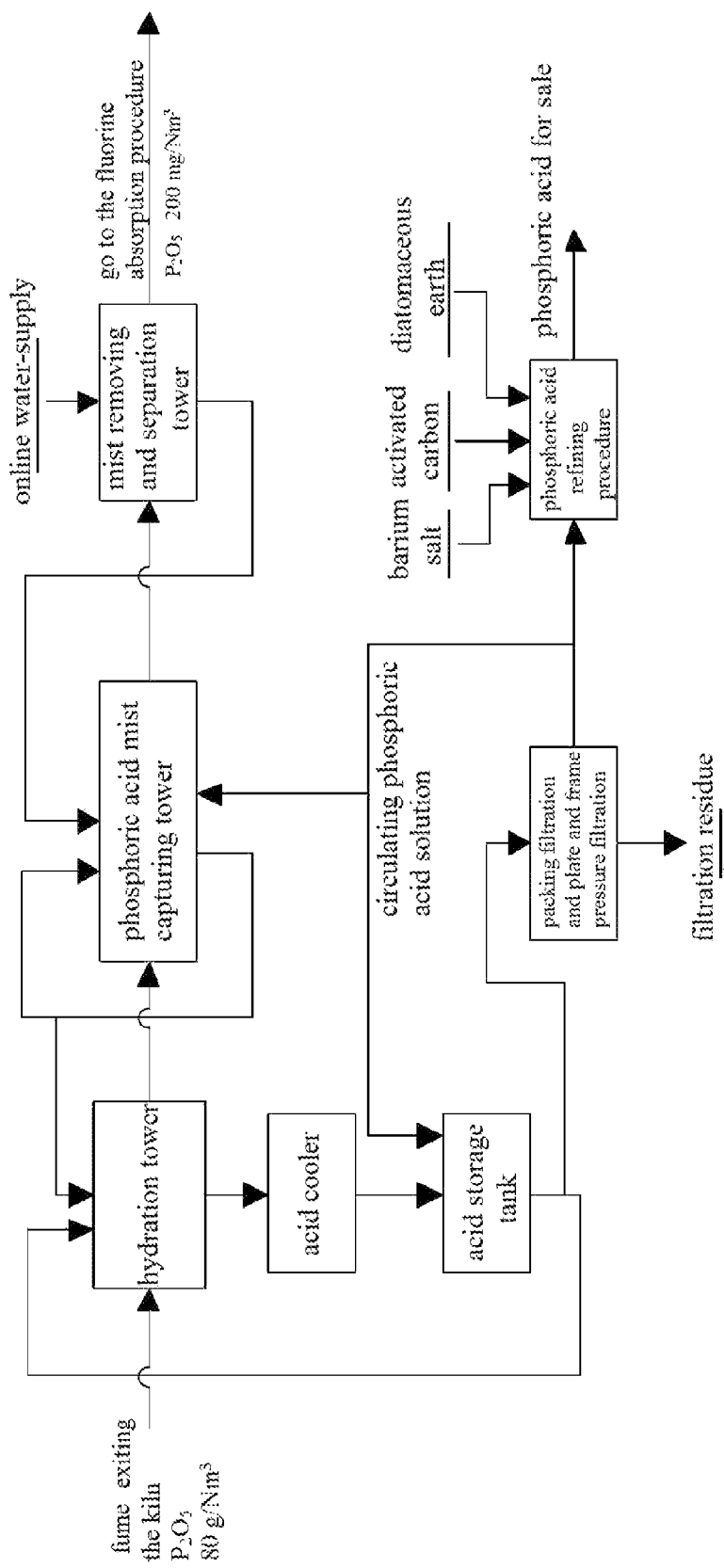
FIG. 6 illustrates a flow chart of a process for phosphorus absorption by hydration according to a specific embodiment of the present invention.

On the basis of the process system provided by the present embodiment, a method for phosphorus absorption by hydration and fluorine recovery for a fume exiting a kiln in a kiln process for the production of phosphoric acid in the present embodiment specifically comprises the following steps (see FIG. 2, FIG. 3 and FIG. 6):

1. The absorption of $P_2O_5$ by hydration in hydration tower:

The fume containing $P_2O_5$ and fluorine (a particular case is the fume in the KPA with a temperature higher than 500° C. and a content of $P_2O_5$ of 80 g/Nm$^3$) is pumped into the hydration tower 1 via the fume inlet 11 at the lower part of the tower following the turning on of the circulating pump 2 in the acid solution circulating and spraying system, and thus the concentrated phosphoric acid in the hydration tower 1 is sprayed from the upper and middle concentrated phosphoric acid spraying layers 24, the concentrated phosphoric acid from a portion of nozzles in the upper concentrated phosphoric acid spraying layer 24 is sprayed to the inner wall of the tower in a oblique direction, and the concentrated phosphoric acid from other nozzles is sprayed in a vertical direction, the phosphoric acid from the nozzles in the middle and lower spraying layers is sprayed in a vertical direction, The transfer of mass and heat takes place after a complete and counter-flow contact of the spraying concentrated phosphoric acid and the fume containing $P_2O_5$ and fluorine fed into the tower, and $P_2O_5$ in the fume reacts with the water in the spraying concentrated phosphoric acid to form phosphoric acid, and over half the phosphoric acid obtained in the chemical reaction is absorbed by the spraying liquid, and the rest is remained in the gas in form of phosphoric acid mist, however, the fluorine-containing substances (mainly in form of $SiF_4$ and HF) in the fume exiting the kiln is difficult to be absorbed by the spraying liquid in the hydration tower under a condition with concentrated phosphoric acid and a high temperature; and the temperature of the fume decreases to a range of 75° C. to 130° C. after the heat transfer between the fume and concentrated phosphoric acid of lower temperature sprayed cyclically and cooling of the fume by the water-cooling system 17 in the hydration tower 1, and the temperature of the circulating concentrated phosphoric acid out of the hydration tower 1 is increased to a range of 70° C. to 95° C. According to the content of water in the fume, the mass concentration of the concentrated phosphoric acid sprayed cyclically is adjustable in a range of 60% to 90% (a concentrated phosphoric acid with a mass concentration of 70% to 85% is used in the present embodiment), and the temperature of concentrated phosphoric acid fed into the hydration tower is controlled in a range of 50° C. to 80° C., and the spraying liquid-gas ratio can be adjusted in a range of 3 L/m$^3$ to 20 L/m$^3$. The phosphoric acid mist in the fume exiting the kiln is hardly subsided in the hydration tower 1 and then exhausted with the fume exiting the hydration tower 1. The hydration tower 1 has the function of both cooling the fume and absorption of $P_2O_5$ by hydration, and the chemical reaction in hydration tower 1 is as follows:

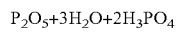

$$P_2O_5 + 3H_2O + 2H_3PO_4$$

The concentrated phosphoric acid falling from the spraying in the hydration tower 1 finally enters the acid solution circulating and spraying system via the liquid inlet 14 and then into an acid cooler 18, the acid cooler 18 is an agitating tank with a heat exchange plate which is made of several stainless steel tubes, and inside the stainless steel tubes is fed the circulating and cooling water, a forced convection heat transfer between the phosphoric acid flowing into the acid cooler 18 and the heat exchange plate with stirring of the liquid occurs, and with an increased efficiency of heat transfer, a portion of enthalpy in the concentrated phosphoric acid is transferred to the circulating and cooling water in the acid cooler 18, the heat in the circulating concentrated phosphoric acid is constantly transferred away by the cooling water. The circulating acid out of the outlet of the acid cooler 18 enters an acid storage tank 16 and then is sent back again to the nozzles in the upper and middle circulating and spraying layers by the circulating pump 2 for circulating and spraying.

2. The capture of phosphoric acid mist in the phosphoric acid mist capturing tower:

The gas phase substance (fume) discharged from the fume outlet 12 at the top of the hydration tower 1 is conveyed to the washing pipe 31 in phosphoric acid mist capturing tower 3, the phosphoric acid mist capturing tower is a fluid-state counter-flow washing tower, the circulating dilute phosphoric acid is sprayed from down to up in the washing pipe 31, a collision and contact between dilute phosphoric acid and the fume flow running from up to down with a high speed occurs to form a intensive turbulent area in the gas-liquid interface area, and the fume passes through a stable foam zone (foam column) with a certain height which is formed after the balance of fluid momentum and contacts with large-area liquid surface of phosphoric acid solution which is constantly updated, the capture and polymerization of particles and heat transfer take place in the foam zone, the most of phosphoric acid mist in the fume is absorbed by circulating dilute phosphoric acid, and a superficial velocity of the fume and liquid-gas ratio in an absorption zone are in a range of 10 m/s to 30 m/s and 3 L/m$^3$ to 25 L/m$^3$, respectively. The temperature of the fume is further decreased to a range of 60° C. to 75° C. by adiabatic evaporation of water in circulating dilute phosphoric acid solution. Compared with the traditional Venturi demister in a hot process for production of phosphoric acid, the utilization of phosphoric acid mist capturing tower according to the present invention can make both the dynamic pressure head loss of the device and energy consumption of the acid storage installation reduced with the same effect of removing phosphoric acid mist.

The circulating and spraying acid in phosphoric acid mist capturing tower 3 is dilute phosphoric acid with a mass concentration of 10% to 50%, the gas and liquid in the washing pipe 31 are transferred to the separation tank 32 located at the lower part of the tower for gas-liquid separation, and the circulating acid obtained by separation falls to the bottom of the separation tank 32 which is also used as a circulating acid tank, the dilute phosphoric acid can be sent back by the circulating pump 2 to the washing pipe 31 or the dilute phosphoric acid spraying layer 25 in the hydration tower 1 for acid crossflow according to the actual requirements.

3. The absorption of phosphoric acid mist in mist removing and separating tower:

The fume discharged from the fume outlet 12 in the phosphoric acid mist capturing tower 3 enters the mist removing and separating tower 4 for a further gas-liquid separation to further remove phosphoric acid mist in the fume, the lower part of the mist removing and separating tower is designed to be a phosphoric acid liquid drop capturing structure 43 which is similar to a cyclone duster, and the phosphoric acid liquid drop capturing structure captures the grown phosphoric acid liquid drop in the fume by centrifugation, the upper part of the mist removing and separating tower is provided with a mesh demister 42, and the phosphoric acid mist drop which is not grown up is further captured by the mesh demister to ensure a direct yield of $P_2O_5$ in the device; and the fume after phosphorus absorption by hydration discharged from the mist removing and separating tower 4 is conveyed to the device for fluorine recovery.

The process of absorption by hydration requires a constant supply of water because of the consumption of water in the chemical reaction with $P_2O_5$ in the process for absorption of phosphoric acid by hydration and the evaporation of water in the spraying acid in cooling process of the fume, in the present embodiment, all of the supplied water is fed into the fume outlet 12 in the mist removing and separating tower 4, and thus the online water flushing device 41 is used as both a water supplying device and a water flushing device for the mesh demister in the mist removing and separating tower 4. The concentration of the circulating acid in the phosphoric acid mist capturing tower 3 will be decreased gradually because all the supplied water is added into the mist removing and separating tower 4, and the underflow solution in the mist removing and separating tower 4 is sent back to the phosphoric acid mist capturing tower 3 from the acid inlet 34, and on the other hand, the concentration of the circulating acid in the hydration tower 1 will be increased gradually because of the constant absorption of $P_2O_5$ in the fume, therefore, the crossflow between the circulating acid system in the hydration tower 1 and the phosphoric acid mist capturing tower 3 is necessary for the stabilization of the concentration of the respective circulating acid, and the acid for crossflow in the hydration tower 1 needs to be clarified and filtered by the packing filter 22 firstly and then conveyed to the phosphoric acid mist capturing tower 3, and the acid for crossflow in the phosphoric acid mist capturing tower 3 is directly leaded from the outlet of the circulating pump 2 in the phosphoric acid mist capturing tower 3 to the hydration tower 1. The circulating acid in the hydration tower 1 absorbs impurities such as dust in the fume, in order to prevent the accumulation of impurities, the extra acid in the acid solution circulating and spraying system in the hydration tower 1 (corresponding to the production of acid based on material balance) is conveyed to the packing filter 22 for filtration and clarifying (primary filtration), a part of the clarified liquid obtained is conveyed to the phosphoric acid mist capturing tower 3 for acid crossflow and another part thereof enters a refining procedure as a crude product of phosphoric acid followed by addition of active carbon, diatomite, and barium salt to remove the color of crude phosphoric acid and sulfate ion, and purification in a plate and frame pressure filter 21 (secondary filtration) to form an end product of concentrated phosphoric acid.

4. primary fluorine absorption:

The fume after phosphorus absorption by hydration is conveyed to the fluorosilicic acid washing pipe 51 in primary fluorine absorption tower 5, then a complete contact of gas phase and liquid phase between most of fluorine (mainly $SiF_4$) in the fume flowing from up to down and circulating fluorosilicic acid (with a mass concentration of 10% to 20%) sprayed from down to up by the nozzle 35 occurs, and then the mass and heat transfer and chemical reaction between most of fluorine (mainly $SiF_4$) in the fume and circulating fluorosilicic acid take place, fluorosilicic acid is formed after the chemical reaction, at the same time, most of the enthalpy in the fume is transferred into circulating fluorosilicic acid solution by heat transfer, and the temperature of the fume is further decreased to a range of 50° C. to 70° C. by adiabatic evaporation of water in circulating fluorosilicic acid solution and heat transfer to circulating fluorosilicic acid solution from the fume; the main chemical reaction in this step is as follows:

$$3SiF_4+3H_2O=2H_2SiF_6+SiO_2.H_2O.$$

5. primary gas-liquid separation:

The final product in the fluorosilicic acid washing pipe 51 is all conveyed to a fluorosilicic acid separation tank 52 for gas-liquid separation, and the gas obtained by separation enters the secondary fluorosilicic acid washing pipe 61 of the secondary fluorine absorption tower 6 via the fume outlet of primary fluorine absorption tower 5, and the liquid obtained by separation is remained in the fluorosilicic acid separation tank 52 and then conveyed to fluorosilicic acid washing pipe 51 for the operation in step 4 via a circulating and conveying pipeline which has a circulating pump 2.

6. The secondary fluorine absorption:

The fume (most remaining fluorine-containing substance is mainly $SiF_4$) flowing from up to down in the secondary fluorosilicic acid washing pipe 61 contacts completely with circulating fluorosilicic acid solution (with a mass concentration of 0.5% to 5%) sprayed from down to up by the nozzle 35, and then the mass and heat transfer and chemical reaction between the fume and circulating fluorosilicic acid take place, fluorosilicic acid is formed after the chemical reaction, at the same time, the enthalpy in the fume is transferred again into circulating fluorosilicic acid solution by heat transfer; the temperature of the product obtained after being processed according to step 3 is further decreased below 60° C.; the main chemical reactions occurring in the present step and step 4 are the same.

7. The secondary gas-liquid separation:

The final product in the secondary fluorosilicic acid washing pipe 61 is all transferred to the secondary fluorosilicic acid separation tank 62 for gas-liquid separation, the top of the secondary fluorosilicic acid separation tank 62 is provided with a demisting unit to remove the mist carried in the fume and increase the absorption rate for fluorine, the demisting unit is washed by the circulating fluorosilicic acid sprayed form the top of the secondary fluorosilicic acid separation tank 62. The gas obtained by separation enters the subsequent tail gas absorption tower to be further processed via a fume outlet of secondary fluorine absorption tower 6, the liquid obtained by separation is remained in the fluorosilicic acid separation tank 62 and then transferred back to secondary fluorosilicic acid washing pipe 61 for the operation in step 6 via a circulating and conveying pipeline which has a circulating pump 2, a fluorosilicic acid cooler 63 is installed on the circulating and conveying pipeline to remove a part of heat in circulating fluorosilicic acid solution and then ensure the absorption reaction of fluorine to be carried out at an appropriate temperature. The circulating fluorosilicic acid solution is cooled by a fluorosilicic acid cooler 63 (a conventional cooling equipment) before entering into the secondary fluorosilicic acid washing pipe 61; and a part of the extra circulating fluorosilicic acid solution may be discharged directly into the fluorosilicic acid separation tank 52 in primary fluorine absorption tower 5.

The fluorine (mainly $SiF_4$) originally in the fume is accumulated in the circulating fluorosilicic acid solution in primary fluorine absorption tower 5 and secondary fluorine absorption tower 6, the concentration of the fluorosilicic acid in primary fluorine absorption tower 5 may increase because of absorption of $SiF_4$ and HF originally in the fume, the extra fluorosilicic acid solution in the secondary fluorine absorption tower 6 is discharged into primary fluorine absorption tower 5 to keep a constant concentration for fluorosilicic acid in primary fluorine absorption tower 5, finally the extra fluorosilicic acid solution in primary fluorine absorption tower 5 is conveyed to the pressure filter 21 via a feeding pump for pressure filtration to remove solid materials such as silica gel, the filtrate obtained is conveyed to the fluorosilicic acid refining procedure to form the fluorosilicic acid product (with a concentration of approximately 12%) or be processed to form fluorine salts product:

the filtration residue is silica gel and the silica gel obtained after being washed and purified is a byproduct.

8. The absorption and purification of the tail gas:

The fume in the tail gas absorption tower 7 moving from down to up comes into a counter-flow contact with sodium hydroxide solution sprayed from up to down, the absorbing-liquid tank at the bottom of the tail gas absorption tower 7 is connected to the spraying layers in the tower via a circulating pump 2 to form a circulating and spraying system; a constant addition of dilute sodium hydroxide solution is necessary for maintaining a pH value higher than 8 to ensure an absorption capacity of the absorbing-liquid, and the absorbing-liquid needs to be discharged constantly for wastewater treatment because of the addition of dilute sodium hydroxide solution and accumulation of impurities absorbed, such as $P_2O_5$ and fluorine, the water after treatment and recovery may be used again in raw material treatment procedure in KPA; the fume is further washed and purified by absorption of remaining pollutants ($P_2O_5$, $SiF_4$ and dust etc) in the fume to reach the natural discharge standard (with a content of fluorine in gas lower than 9 $mg/m^3$), and then the fume is discharged into the chimney by a draught fan. The main chemical reactions occurring in the present step are as follows:

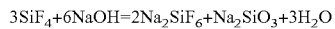

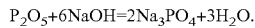

The above is only preferred embodiments of the present invention, the equivalent modifications, transformations and polish based on the technical solutions described above are within the scope of the present invention.

The invention claimed is:

1. A method for phosphorus absorption by hydration for the fume exiting the kiln in KPA comprising the following steps:
   (1) introducing a fume exiting the kiln containing $P_2O_5$ and fluorine into a hydration tower, and feeding concentrated phosphoric acid solution into a spraying device in the hydration tower by an acid solution circulating and spraying system, counter-flow contacting the downwardly sprayed concentrated phosphoric acid solution with the fume exiting the kiln which contains $P_2O_5$ and fluorine in the tower for heat transfer and mass transfer, forming phosphoric acid after chemical reaction between $P_2O_5$ in the fume and the water in the spayed concentrated phosphoric acid, and absorbing most of phosphoric acid obtained in the chemical reaction by the spraying liquid and remaining the rest in the gas phase in form of phosphoric acid mist, discharging the remaining fume in hydration tower from a fume outlet;
   (2) introducing the phosphoric acid solution sprayed and falling down in the hydration tower into the acid solution circulating and spraying system and then into an acid cooler, pumping the sprayed phosphoric acid solution flowing from an outlet of acid cooler back to the spraying device in the hydration tower for circulating and spraying again;
   (3) introducing the fume discharged out of the fume outlet through a phosphoric acid mist capturing tower and a mist removing and separating tower for further capture of the phosphoric acid mist in the fume, forming a dilute phosphoric acid solution after capture of the phosphoric acid mist by phosphoric acid mist capturing tower and mist removing and separating tower, keeping acid crossflow of the dilute phosphoric acid solution with concentrated phosphoric acid solution in the hydration tower via pipeline arrangement;
   the acid crossflow in step (3) refers to: pumping the dilute phosphoric acid solution captured by phosphoric acid mist capturing tower and mist removing and separating tower to the hydration and then mixing with concentrated phosphoric acid solution in hydration tower to maintain a stable concentration of acid in acid solution circulating and spraying system in hydration tower; at the same time, drawing out a part of concentrated phosphoric acid solution in acid solution circulating and spraying system in hydration tower and then clarifying by a filtering device, a part of supernatant obtained after clarifying is conveyed to the phosphoric acid mist capturing tower for acid crossflow to maintain a stable concentration of acid, and another part of supernatant obtained after clarifying is conveyed back to an acid storage tank in hydration tower;
   (4) during the above operation, the concentrated phosphoric acid solution in acid solution circulating and spraying system keeps increasing, filtering the surplus part of concentrated phosphoric acid solution and forming a crude phosphoric acid product, and then introducing the crude phosphoric acid product to a subsequent phosphoric acid refining procedure,
   the spraying device in the hydration tower comprises at least two spraying layers located at different heights in a chamber of the hydration tower, and the spraying layers comprises at least a dilute phosphoric acid spraying layer and a concentrated phosphoric acid spraying layer, and the concentrated phosphoric acid spraying layer is located above the dilute phosphoric acid spraying layer,
   a liquid inlet pine of the concentrated phosphoric acid spraying layer is connected to the acid solution circulating and spraying system, a liquid inlet pine of the dilute phosphoric acid spraying layer is connected to a circulating and conveying pipeline for dilute phosphoric acid solution in the phosphoric acid mist capturing tower to enable the dilute phosphoric acid solution in phosphoric acid mist capturing tower to be conveyed to hydration tower for acid crossflow, the acid solution circulating and spraying system is connected to the phosphoric acid mist capturing tower via another pipeline to enable the circulating phosphoric acid in the hydration tower to be conveyed to the phosphoric acid mist capturing tower for acid crossflow,
   the phosphoric acid mist capturing tower is a fluid-state counter-flow washing tower which mainly comprises a washing pine and a separation tank, fume discharged out from the fume outlet of hydration tower enters the washing pine of phosphoric acid mist capturing tower, the circulating dilute phosphoric acid sprayed from down to up in the washing pipe performs a counter-flow collision and contact with up-down fume flow to form a foam zone, the fume passes through the foam zone and contacts with large-area liquid surface of dilute phosphoric acid solution which updates constantly, and then capture and polymerization of phosphoric acid mist particles and heat transfer occurs in the foam zone, a temperature of the fume is further decreased to 60-90° C. by adiabatic evaporation of water in circulating dilute phosphoric acid solution; the gas and liquid in the washing pipe are transferred to the separation tank located at the lower part of the tower for gas-liquid separation, the separation tank is also used as a circulating acid tank, most the circulating phosphoric acid falling into the bottom of the separation tank is sent back to the washing pipe and a small part thereof is conveyed to the hydration tower for acid crossflow; the mass concentration of circulating and spraying dilute phosphoric acid solution in phosphoric acid mist capturing tower is 10%-50%; the temperature of dilute phosphoric acid solution is controlled as 40-70° C., and the spraying liquid-gas ratio in phosphoric acid mist capturing tower is controlled as 3 L/m$^3$-25 L/m$^3$.

2. The method according to claim 1, wherein, the step (4) of the method comprising: during the above operation, the concentrated phosphoric acid solution in acid solution circulating and spraying system keeps increasing, filtering the surplus part of concentrated phosphoric acid solution and forming a crude phosphoric acid product, and then introducing the crude phosphoric acid product to a subsequent phosphoric acid refining procedure; on the other hand, online supplying water for the entire process by an online water supplying device, introducing the fume out of the outlet of the mist removing and separating tower to a subsequent fluorine recovery procedure.

3. The method according to claim 1, wherein, the acid cooler is structured in a way that a plurality of heat exchange plates made of modified graphite pipes or stainless steel pipe are arranged in an agitation tank, circulating and cooling water is introduced in the pipes, through agitation the phosphoric acid solution entering the acid cooler forms forced convection and heat exchange on the heat exchange plates.

4. The method according to claim 3, wherein, the temperature of the fume exiting the kiln in the step (1) is reduced to 75-130° C. because of the heat transfer between fume exiting the kiln and circulating phosphoric acid solution which is spraying cyclically and cooling by a water-cooling system in hydration tower.

5. The method according to claim 1, wherein, the mass concentration of circulating and spraying phosphoric acid solution in hydration tower is 60%-90%, the temperature of concentrated phosphoric acid fed into the hydration tower is controlled 50-80° C., and the spraying liquid-gas ratio in hydration tower is controlled 1 L/m$^3$-20 L/m$^3$.

6. The method according to claim 1, wherein, in the phosphoric acid refining procedure is provided a phosphoric acid refining tank for refining crude phosphoric acid product, active carbon, diatomite, desulfurizing agent and dearsenic agent are added into the phosphoric acid refining tank, pumping a product after reaction and stirring into filtration system for filtration, a filtrate obtained is end product of phosphoric acid.

7. The method according to claim 6, wherein, the additive amount of both active carbon and diatomite are controlled as 0.1%-2% of the mass of crude phosphoric acid product to be refined; the desulfurizing agent is soluble barium salts with an additive amount of 1-2 times a theoretical amount; the dearsenic agent is hydrogen sulfide or sodium sulfide with an additive amount of 1-1.2 times a theoretical amount; the reaction in the phosphoric acid refining tank is stirred for 0.5 h-2 h.

8. The method according to claim 1, wherein, the fume discharged from the fume outlet in the phosphoric acid mist capturing tower enters the mist removing and separating tower for a further gas-liquid separation, a lower part of the mist removing and separating tower is designed to be a phosphoric acid liquid drop capturing structure which is similar to a cyclone duster, and the phosphoric acid liquid drop capturing structure captures the grown phosphoric acid liquid drop in the fume by centrifugation, an upper part of the mist removing and separating tower is provided with a mesh demister, and the phosphoric acid mist drop which is not grown up is further captured by the mesh demister; the online water supplying device is installed in the mist removing and separating tower and located at the position of the fume outlet above the mesh demister, on the one hand, the online water supplying device is water-supplying equipment for the entire process system, on the other hand, it is also used as a flushing device for the mesh demister with further capturing phosphoric acid mist in the fume by washing.

9. A method for phosphorus absorption by hydration and fluorine recovery for the fume exiting the kiln in KPA, wherein, the method comprising a method for phosphorus absorption by hydration and a method for fluorine recovery, the method for phosphorus absorption according to claim 1, and the method for fluorine recovery comprising following steps:

(1) primary fluorine absorption: firstly conveying the fluorine-containing fume discharged out of the mist removing and separating tower to a fluorosilicic acid washing pipe in a primary fluorine absorption tower, completely contacting the fume flowing from up to down with circulating fluorosilicic acid sprayed from down to up by a nozzle, forming fluorosilicic acid after the mass transfer, heat transfer and chemical reaction between the fume and circulating fluorosilicic acid, at the same time, transferring a portion of enthalpy in the fume into the steam by adiabatic evaporation of water in circulating fluorosilicic acid solution;

(2) primary gas-liquid separation: conveying the gas and liquid in the fluorosilicic acid washing pipe to a fluorosilicic acid separation tank for gas-liquid separation, and introducing the gas obtained by separation to a secondary fluorosilicic acid washing pipe of a secondary fluorine absorption tower via a fume outlet of primary fluorine absorption tower, and remaining the liquid obtained by separation in the fluorosilicic acid separation tank, and then conveying the liquid back to fluorosilicic acid washing pipe for the operation in step (1) via a circulating and conveying pipeline which has a circulating pump;

(3) the secondary fluorine absorption: completely contacting the fume flowing from up to down in the secondary fluorosilicic acid washing pipe with circulating fluorosilicic acid sprayed from down to up by a nozzle, forming fluorosilicic acid after the mass transfer, heat transfer and chemical reaction between the fume and circulating fluorosilicic acid, at the same time, the enthalpy in the fume is partially transferred into circulating fluorosilicic acid solution by heat transfer;

(4) the secondary gas-liquid separation: conveying the gas and liquid in the secondary fluorosilicic acid washing pipe to a secondary fluorosilicic acid separation tank for gas-liquid separation, and introducing the gas obtained by separation to a tail gas absorption tower for farther process via a fume outlet of secondary fluorine absorption tower, and remaining the liquid obtained by separation in the fluorosilicic acid separation tank, conveying a part of the liquid described above back to secondary fluorosilicic acid washing pipe for the operation in step (3) by a circulating pump and conveying another part thereof to fluorosilicic acid separation tank of primary fluorine absorption tower;

(5) the fluorosilicic acid solution in primary fluorine absorption tower keep increasing and filtering the extra fluorosilicic acid solution for removing of silica gel and forming a byproduct of fluorosilicic acid.

10. The method according to claim 9, wherein, the primary and secondary fluorine absorption tower are both fluid-state counter-flow washing towers, primary fluorine absorption tower mainly comprises the fluorosilicic acid washing pipe and the fluorosilicic acid separation tank, an outlet of the fluorosilicic acid washing pipe is connected to the middle part of the fluorosilicic acid separation tank, the top of the fluorosilicic acid separation tank is provided with a fume outlet, and at the bottom thereof a fluorosilicic acid liquid outlet is connected to a nozzle in the fluorosilicic acid washing pipe via a circulating and conveying pipeline which has a circulating pump.

11. The method according to claim 9, wherein, the secondary fluorine absorption tower mainly comprises the secondary fluorosilicic acid washing pipe and the secondary fluorosilicic acid separation tank, a fume outlet of primary fluorine absorption tower is connected to the secondary fluorosilicic acid washing pipe via a pipeline, and an outlet of secondary fluorosilicic acid washing pipe is connected to the middle part of secondary fluorosilicic acid separation tank, the top of the secondary fluorosilicic acid separation tank is provided with a defoaming layer and a fume outlet, and at the bottom thereof a fluorosilicic acid liquid outlet is in communication with a nozzle in the secondary fluorosilicic acid washing pipe and primary fluorosilicic acid separation tank via a circulating and conveying pipeline which has a circulating pump.

12. The method according to claim 11, wherein, the circulating and conveying pipeline in secondary fluorine absorption tower is provided with a fluorosilicic acid cooler, the circulating fluorosilicic acid is cooled by the fluorosilicic acid cooler before entering the secondary fluorosilicic acid washing pipe.

13. The method according to claim 11, wherein, the fume inlet of the secondary fluorine absorption tower is also connected to the tail gas absorption tower which is an empty spraying tower, the top of the tail gas absorption tower is provided with a fume outlet, and the upper part of inside thereof is provided with a spraying layer, and the bottom thereof is provided with an absorbing-alkali solution tank, an outlet of the absorbing-alkali solution tank is connected to the spraying layer in the tail gas absorption tower via a circulating and conveying pipeline which has a circulating pump, the pH value of the absorbing-alkali keeps not low than 8.

14. The method according to claim 9, wherein, the mass concentration of circulating fluorosilicic acid solution used in primary fluorine absorption is 8%-25%, the temperature of circulating fluorosilicic acid solution is 25-65° C., the spraying liquid-gas ratio is controlled as 3 $L/m^3$-25 $L/m^3$; the mass concentration of circulating fluorosilicic acid solution used in the secondary fluorine absorption is 0.5%-5%, the temperature of circulating fluorosilicic acid solution is 25-60° C., the spraying liquid-gas ratio is controlled as 3 $L/m^3$-25 $L/m^3$.

15. The method according to claim 9, wherein, the mass concentration of circulating fluorosilicic acid solution used in primary fluorine absorption is 10%-20%, the temperature of circulating fluorosilicic acid solution is 50-65° C., the spraying liquid-gas ratio is controlled as 3 $L/m^3$-6 $L/m^3$; the mass concentration of circulating fluorosilicic acid solution used in the secondary fluorine absorption is 0.5%-5%, the temperature of circulating fluorosilicic acid solution is 45-60° C., the spraying liquid-gas ratio is controlled as 3 $L/m^3$-6 $L/m^3$.

* * * * *